June 3, 1958

T. DOMBROWSKI 2,837,000

PATTERN SUPPORTS FOR LATHES

Filed Oct. 27, 1953

INVENTOR:
THEODOR DOMBROWSKI
BY:

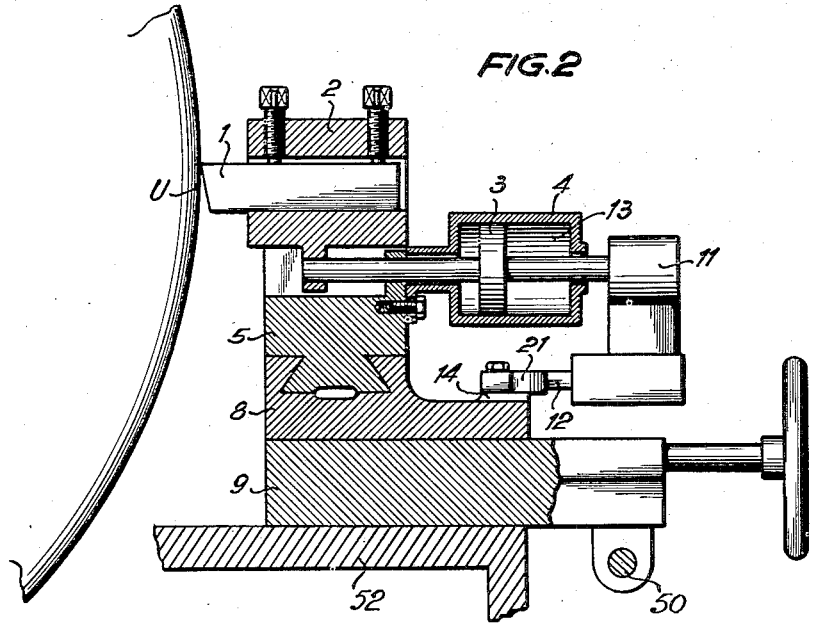
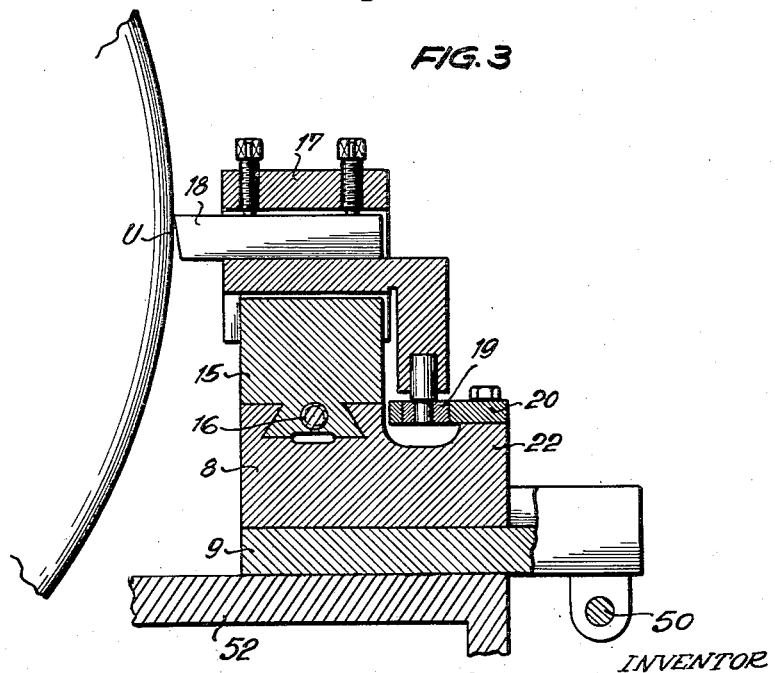

United States Patent Office 2,837,000
Patented June 3, 1958

2,837,000

PATTERN SUPPORTS FOR LATHES

Theodor Dombrowski, Erkelenz, Germany

Application October 27, 1953, Serial No. 388,507

Claims priority, application Germany October 31, 1952

8 Claims. (Cl. 82—14)

The invention relates to a pattern support for lathes, especially lathes for machining sets of wheels.

For machining wheel-rim contours, there are frequently used, at the present time, for the purpose of tool-guiding, feeler control devices which operate with great accuracy. Hitherto, however, the only supports known have been supports having a single feeler-controlled tool. The output of such supports is comparatively small, because only one tool machines the contour. The known pattern-supports with mechanically controlled tools are, in comparison, considerably more efficient, because, when they are employed, a plurality of tools machine the contour at the same time and, consequently, obtain a considerably greater output. Feeler-controlled supports have therefore not hitherto been very successful in the case of wheel-set lathes in comparison with pattern-supports.

The object of the invention is, therefore, to arrange a plurality of feeler-controlled tools on supports for machining complicated contours such as contours of wheel rims.

According to the invention, the wheel rim is machined on its contour, at the same time, by a plurality of tools which are controllable independently of one another and at least one of which is feeler-controlled. In this way, the time for operation for turning a wheel rim, even one employing feeler-control devices, is considerably reduced. The feeler-control device has special advantages, particularly in the case of the flange which it is difficult to machine, because, with the increased demands for accuracy, patterns, i. e., mechanical tool-controlling devices, produce difficulties.

In one embodiment of the invention, both the contour of the tread and the contour of the flange are each machined by a feeler-controlled tool. The division of the contour of the wheel rim into a tread and a flange renders possible the employment of manifoldly applicable feeler-controlling devices for the machining of the flange and of simple feeler-controlling devices for the machining of the tread. Consequently, both the space requirement and the expense of this double control remain technically and economically within tolerable limits.

However, in a second embodiment of the invention, the contour of the tread can be machined by a tool which is guided mechanically with a pattern and a pattern roller and the contour of the flange can be machined by a feeler-controlled tool. This embodiment is specially suitable when the tread has only one inclination, as is frequently the case with foreign wheel-rim profiles. For this purpose, there is employed a tool which is fixed on a longitudinal slide which extends obliquely to the axis of the work piece. The construction is simple and cheap and, according to experience, is sufficient for the accurate machining of the treads. The contour of the flange is machined by a feeler-controlled tool.

If the obliquely set slide is, in addition, put on a rotating part, there is obtained the advantage that different inclinations of the tread can be machined with the same support. In this way, the support has a manifold applicability.

The tread tool is fed mechanically and in dependence upon the speed of rotation of the spindle of the machine, whilst the flange tool is hydraulically fed regulatably within wide limits. The mechanical feed is then the directive feed for every speed of the spindle. The hydraulic feed is regulatable in accordance with the directive feed.

The feed spindle for the flange tool drives a piston at the same time. The cylinder concerned has the same volume as the, for example, three, feed cylinders for the flange tool and delivers the feed quantity of oil for the feed cylinders of the flange tool. In the case of this arrangement, the feed is parallel or transverse to the axis of the work piece and, in the case of the flange tool, the feed is the same as that of the tread tool. When the magnitude of the feed for the tread tool is altered, the magnitude of the feed for the flange tool is altered automatically.

An initial-pressure valve puts the suction sides, which communicate with one another, of the cylinders for the flange tool under pressure. In this way, the suction sides of the cylinders also become filled with a pressure medium, for example pressure oil, and renders a sucking-in of air impossible. There is thus produced a completely closed system without difficulties arising from inclusions of air.

Two examples of embodiment are represented in the accompanying drawings, of which Fig. 1 is a plan view of the pattern support;

Fig. 2 is a longitudinal section on the line II—II of Fig. 1;

Fig. 3 is a longitudinal section on the line III—III of Fig. 1;

Figure 1:
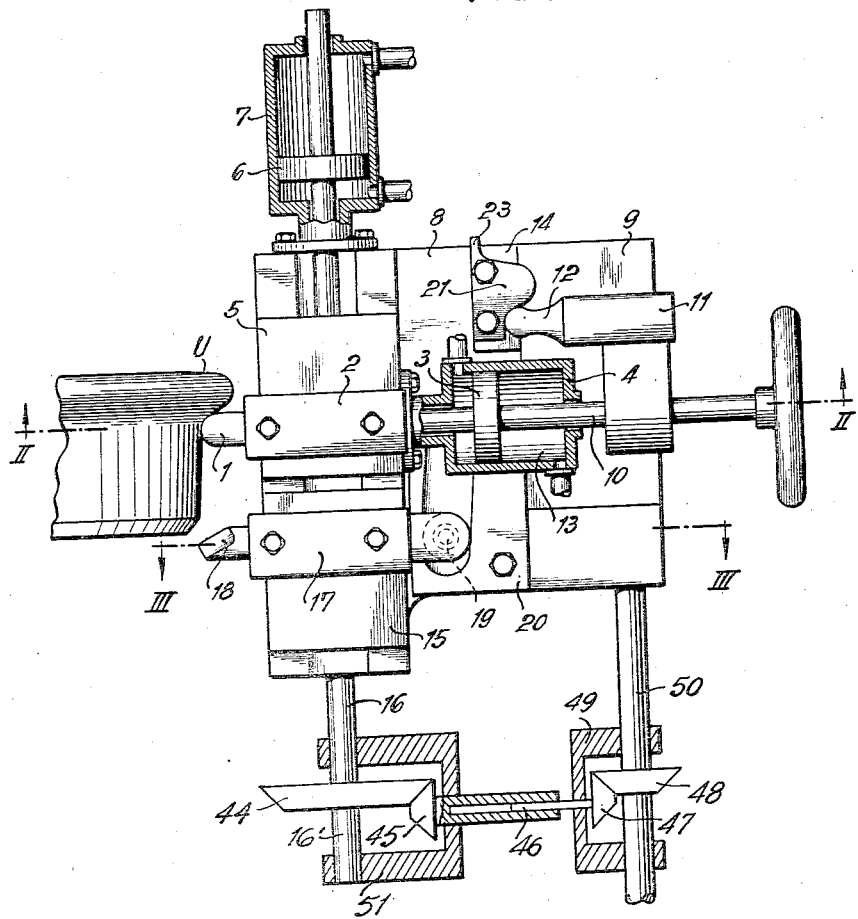

The tool 1 machines the flange of the wheel-rim contour U and is fixed on a transverse slide 2. The transverse slide 2 is connected with a piston 3 which slides in a cylinder 4. The cylinder 4 is mounted on the longitudinal slide 5. This slide is connected with a piston 6. The guide of the longitudinal slide 5 is parallel to the axis of the work piece. The piston 6 slides in a cylinder 7 which is connected with a cross-slide 8; the cross-slide 8, in turn, slides on the transverse guide of a supporting base 9. The base 9 rests on a bed 52.

On the piston rod 10, which extends out of the free side 13 of the cylinder 4, there are fixed, in this case, controlling-slide casings 11 for a feeler 12 which is movable in casing 11 and, on a platform 14 of the cross-slide 8, there is fixed a pattern 21 for guiding the feeler 12. The feeler 12 controls the feed and discharge of the pressure medium, for example oil, to and from the cylinders 4 and 7. The pressure medium feeds a pressure pump which is not represented here.

Sliding on the longitudinal guide of the cross-slide 8 is a second slide 15 which is displaced by a feed spindle 16. The feed spindle 16 has a shaft end portion 16' and is driven from the control shaft 50 through a telescopic shaft 46 and bevel gears 44, 45, 47 and 48. Shaft 50 is driven from the headstock through a gear transmission, not shown. The telescopic shaft 46 is mounted in bearings 49 and 51 which are turnable about shafts 50 and 16', respectively. Arranged on the slide 15 is a transverse slide 17 in which the tool 18 for machining the tread is clamped. In addition, a roller 19 is rotatably mounted on the free end of the transverse slide 17. The roller 19 co-operates with a pattern 20, the pattern-guide of which corresponds to the contour of the tread. The pattern 20 is fixed on an upwardly extending platform 22 of the cross-slide 8.

The support works as follows:

The cross-slide 8 is shifted vertically to the axis of the work piece; the tool 1 then pierces the throat of the contour U. When the exactly prescribed diameter of the tread circle has been obtained, pressure oil is fed to the controlling-slide casing 11 through a manual controlling slide valve (not shown). The tool 1 begins to operate and rotates out of the throat to the outside of the flange. The magnitude of the feeding forward of the tool 1 corresponds to the quantity of oil adjusted at the pump. Feeding forward of the feed spindle 16 is then started and the tool 18 begins to operate and cuts from the outside of the contour to the throat. The hydraulic feed for the tool 1 and the mechanical feed for the tool 18 are so adjusted in relation to each other that the tool 1 comes into its end position when the tool 18 has also reached its end position. In order that an absolutely accurate adjustment of the two feeds to each other should not be necessary and that a feed, once it has been adjusted, should be usable for different widths of flange, the pattern is provided with a starting guide 23 for the tool 1.

In another embodiment, the cylinders 4 and 7 receive their pressure oil from a cylinder 25. The useful cross-sectional areas of the cylinders 4, 7 and 25 are kept equal on both sides of the pistons to one another. The cylinder 25 is fixed on the cross-slide 8. The piston rod 26 is fixed directly on the slide 15. The pressure side 27 of the cylinder 25 is connected directly with the controlling-slide casing 11. The suction side 28 of the cylinder 25 is connected with an initial-pressure valve 29 and a leakage-oil pump 30. By means of the leakage-oil pump, oil is supplied by hand, as required, to the hydraulic system.

The control of the pressure oil discharged from the cylinder 25 is carried out by the feeler 12. The feeler 12 is loosely mounted in the housing 11' of a control valve, and abuts on a valve stem 54 having a piston portion 55 engaged by a spring 36 which urges the valve stem 54 against the feeler 12. On the valve stem 44 are fixedly mounted two control pistons 32 and 34 which constitute together with the stem 54 a slide valve member.

Due to the fact that the feeler 12 can give in lateral direction, transverse shoulders on the pattern 21 can be followed by the feeler. When the feeler 12 moves along the pattern 21, the control pistons 32 and 34 are shifted, while the spring 36 presses the feeler 12 against the pattern 21.

Figure 4:
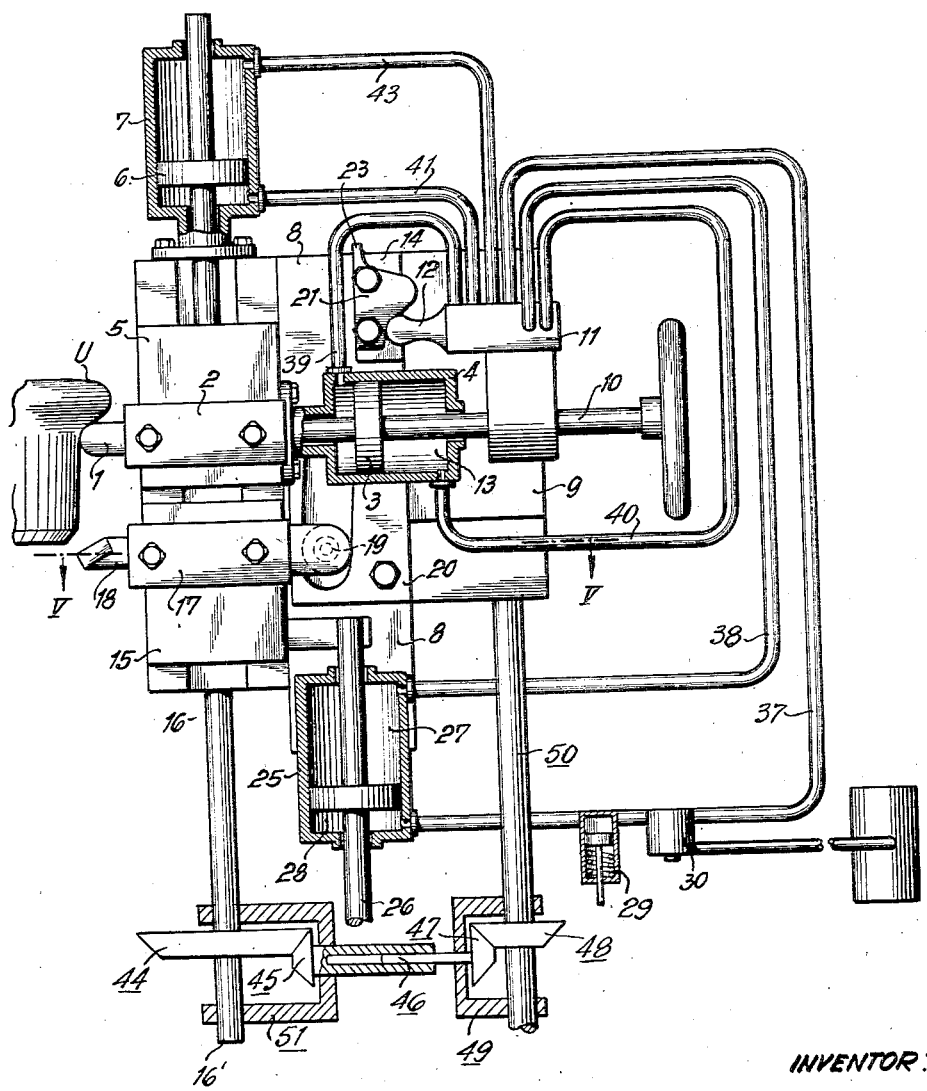
Fig. 4 is a plan of the pattern support with a control for the hydraulic-feed drive.
Figure 5:
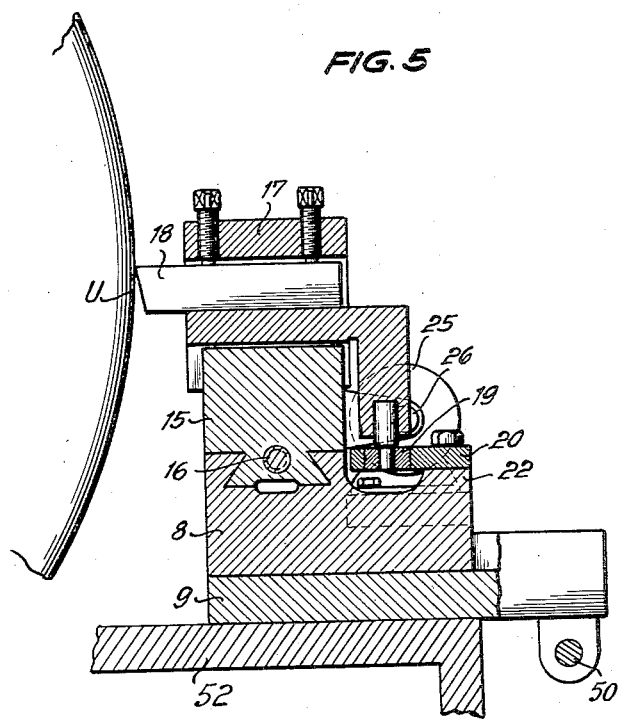
Fig. 5 is a longitudinal section on the line V—V of Fig. 4.

Pressure oil passes from the chamber 27 in the cylinder of the first hydraulic operating means 25 through conduit 38 into the valve chamber 33. In the position illustrated in Fig. 6, the control pistons 32 and 34 close the ports of the conduits 39 and 40 so that the pressure oil introduced through conduit 38 into the valve chamber can only flow through conduit 41. The resistance of the pressure valve 42 is overcome by the pressure oil so that the piston 6 is moved and actuates the slide 5 as shown in Fig. 4. Thereby, a longitudinal feed of the tool 1 is effected.

The feed of tool 1 is immediately varied in accordance with the pattern 21, since the feeler 12 moves along the pattern and shifts the control pistons 32 and 34. Control piston 34 opens a port leading to the conduit 39, and at the same time control piston 32 opens the port of conduit 40 and connects the same with the valve chamber 31 which is connected with the return conduit 37. Consequently, oil can be discharged from the chamber 13 in the cylinder 4 so that the piston 3 can be shifted by the pressure oil passing out of conduit 39 into the other chamber of the cylinder 4. The longitudinal movement of the slide means 5 and of the tool 1 is slowed down, since a portion of the available pressure oil is used for operating piston 3 in addition to piston 6.

During the movement of the feeler 12 and of the control pistons 32 and 34 in opposite directions, the movement of the pressure oil is reversed so that the piston 3 also moves in opposite direction.

A transverse operation without any longitudinal feed occurs, if one of the control pistons 32 or 34 opens one of the conduits 40 or 39 to such extent that the entire pressure oil passing into the valve chamber is discharged through such opening so that the pressure required for opening the pressure valve 42 is not reached.

Figure 6:
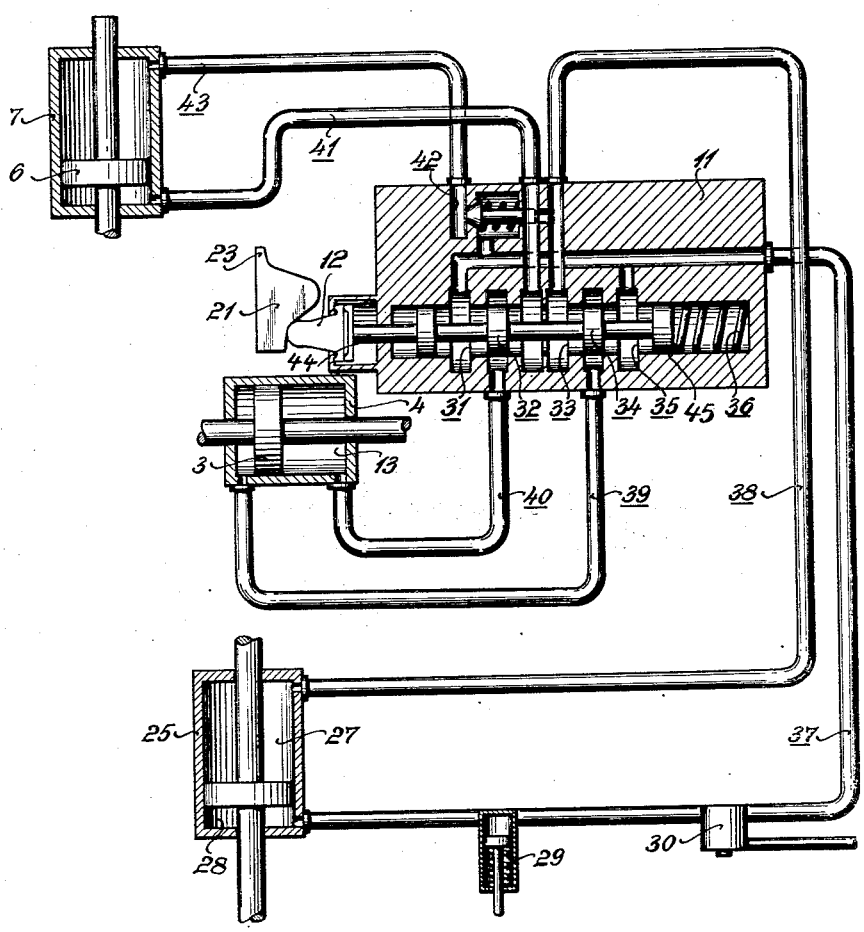
Fig. 6 is a schematic view illustrating the hydraulic control arrangement of the embodiment of Figs. 4 and 5.

The advantage of the hydraulic control arrangement shown in Fig. 6 resides in the fact that the speed of feed of the tool 1 depends to a lesser extent on the shape of the pattern 21. If the feed speed of the tool 18 is $c$, the feed speed of the tool 1 can only vary between the speed $c$ and the speed $c/\sqrt{2}$. Due to the fact that the dependency of the feed speed of the tool 1 on the shape of the pattern 21 is limited, it is possible to increase the average feed speed of the tool 1 as compared with a pattern control having a constant longitudinal feed whereby the time required for carrying out an operation is reduced.

Due to the combined arrangement of tools having a constant speed of longitudinal feed suitable for simple contours and of tools which are advanced under the control of a hydraulic feeler, the advantages of the constant longitudinal feed can be combined with the advantage of a pattern controlled feed. Thereby, the time for machining a work piece can be reduced and the lathe more economically operated.

I claim:

1. In a device of the type described, in combination, a first slide means for supporting a first tool adapted to work on a first portion of a work piece, said first slide means being movable in one direction; a second slide means for supporting a second tool adapted to work on a second portion of the work piece; a third slide means supporting said second slide means for movement in a direction transverse to said one direction, said third slide means being movable in said one direction; a feed spindle operatively connected to said first slide means for moving the same; a first hydraulic operating means including a first piston member and a first cylinder member, one of said first members being movable and operatively connected with said feed spindle for movement together with said first slide means; a second hydraulic operating means including a second piston member and a second cylinder member, one of said second members being movable and connected to said second slide means for moving the same; a third hydraulic operating means including a third piston member and a third cylinder member one of said members being movable and connected to said third slide means for moving the same; a pattern for controlling said second tool; a feeler cooperating with said pattern; and hydraulic control means controlled by said feeler and connecting said first, second and third cylinders for operating said second tool in accordance with the shape of said pattern and depending on the movement of said first slide means and of said first tool.

2. In a device of the type described, in combination, a first slide means for supporting a first tool adapted to work on a first portion of a work piece, said first slide means being movable in one direction; a second slide means for supporting a second tool adapted to work on a second portion of the work piece; a third slide means supporting said second slide means for movement in a direction transverse to said one direction, said third slide means being movable in said one direction; a feed spindle operatively connected to said first slide means for moving the same; a first hydraulic operating means including a first piston member and a first cylinder member, one of said first members being movable and operatively connected with said feed spindle for movement together with said first slide means; a second hydraulic operating means including a second piston member and a second cylinder member, one of said second members being movable and connected to said second slide means for moving the same; a third hydraulic operating means including a third piston member and a third cylinder member one of said third members being movable and connected to said third slide means for moving the same the effective cross sections of said first, second and third cylinder members being equal; a pattern for controlling said second tool; a feeler cooperating with said pattern; control valve means including a valve housing connected to said one movable second member and a slide valve member in said housing connected to said feeler and operated by the same; and conduit means connecting said first, second and third cylinder members with said valve housing whereby said second and third movable members and thereby said second tool are operated in accordance with the shape of said pattern and depending on the movement of said first slide means.

3. In a lathe for machining a wheel having a flange portion and a tread portion, in combination, a first slide means for supporting a first tool adapted to work on the tread portion of the wheel, said first slide means being movable in one direction; a second slide means for supporting a second tool adapted to work on the flange portion of the wheel; a third slide means supporting said second slide means for movement in a direction transverse to said one direction, said third slide means being movable in said one direction; a feed spindle operatively connected to said first slide means for moving the same; a first hydraulic operating means including a first piston member and a first cylinder member, one of said first members being movable and operatively connected with said feed spindle for movement together with said first slide means; a second hydraulic operating means including a second piston member and a second cylinder member, one of said second members being movable and connected to said second slide means for moving the same; a third hydraulic operating means including a third piston member and a third cylinder member one of said third members being movable and connected to said third slide means for moving the same in the direction of movement of said first slide means; a pattern for controlling said second tool; a feeler cooperating with said pattern; and hydraulic control means controlled by said feeler and connecting said first, second and third cylinders for operating said second tool in accordance with the shape of said pattern and depending on the movement of said first slide means and of said first tool.

4. An apparatus as set forth in claim 3 wherein said first, second and third movable members are said first, second and third piston members, wherein said first, second and third piston members define in said first, second and third cylinder members, respectively a first chamber and a second chamber respectively, wherein said conduit means include first conduit means connected to said first chambers and to said housing and second conduit means connected to said second chambers and to said housing; and including pressure valve means in at least one of said first and second conduit means for maintaining pressure in the same while the respective conduit means is connected to the one of said chambers whose volume is being increased during operation of said slide means due to movement of the associated piston member.

5. An apparatus as set forth in claim 3 wherein said first, second and third movable members are said first, second and third piston members, wherein said first, second and third piston members define in said first, second and third cylinder members, respectively a first chamber and a second chamber respectively, wherein said conduit means include first conduit means connected to said first chambers and to said housing and second conduit means connected to said second chambers and to said housing; and including a leakage pump in at least one of said first and second conduit means.

6. An apparatus as set forth in claim 3 wherein said first, second and third movable members are said first, second and third piston members, wherein said first, second and third piston members define in said first, second and third cylinder members, respectively a first chamber and a second chamber respectively, wherein said conduit means include first conduit means connected to said first chambers and to said housing and second conduit means connected to said second chambers and to said housing; including pressure valve means in at least one of said first and second conduit means for maintaining pressure in the same while the respective conduit means is connected to the one of said chambers whose volume is being increased during operation of said slide means due to movement of the associated piston member; and a leakage pump in said one of said first and second conduits.

7. In a lathe for machining a wheel having a flange portion and a tread portion, in combination, a first slide means for supporting a first tool adapted to work on the tread portion of the wheel, said first slide means being movable in one direction; a second slide means for supporting a second tool adapted to work on the flange portion of the wheel; a third slide means supporting said second slide means for movement in a direction transverse to said one direction, said third slide means being movable in said one direction; a feed spindle operatively connected to said first slide means for moving the same; a first hydraulic operating means including a first piston member and a first cylinder member, one of said first members being movable and operatively connected with said feed spindle for movement together with said first slide means; a second hydraulic operating means including a second piston member and a second cylinder member, one of said second members being movable and connected to said second slide means for moving the same; a third hydraulic operating means including a third piston member and a third cylinder member one of said third members being movable and connected to said third slide means for moving the same in the direction of movement of said first slide means, the effective cross sections of said first, second and third cylinder members being equal; a pattern for controlling said second tool; a feeler cooperating with said pattern; control valve means including a valve housing connected to said one movable second member and a slide valve member in said housing connected to said feeler and operated by the same; and conduit means connecting said first, second and third cylinder members with said valve housing whereby said second and third movable members and thereby said second tool are operated in accordance with the shape of said pattern and depending on the movement of said first slide means.

8. An apparatus as set forth in claim 7 wherein said first, second and third movable members are said first, second and third piston members, wherein said first, second and third piston members define in said first, second and third cylinder members, respectively a first chamber and a second chamber respectively, wherein said conduit means include first conduit means connected to said first chambers and to said housing and second conduit means connected to said second chambers and to said housing.

References Cited in the file of this patent

UNITED STATES PATENTS

| | | |
|---|---|---|
| 2,634,644 | Johnson | Apr. 14, 1953 |

FOREIGN PATENTS

| | | |
|---|---|---|
| 80,574 | Germany | Apr. 6, 1895 |
| 245,479 | Germany | Apr. 6, 1912 |